July 17, 1923.
W. H. SCHULZE
DRIVE CONNECTION FOR TRAVEL INDICATING INSTRUMENTS
Filed July 19, 1922
1,461,806
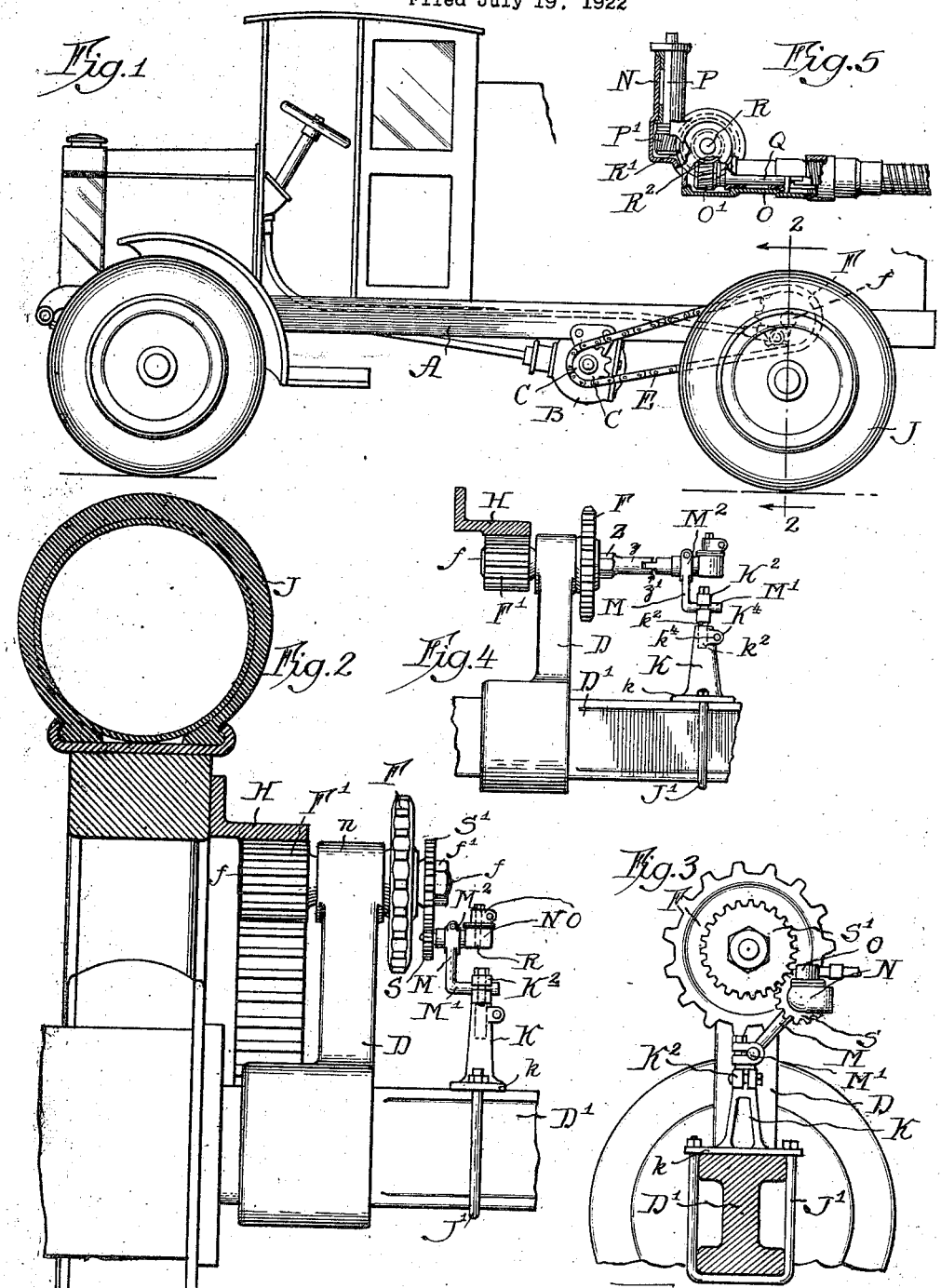
Witness,
Chas. R. Koursh.
Inventor,
William H. Schulze
By Burton & Burton, Attys.

Patented July 17, 1923.

1,461,806

UNITED STATES PATENT OFFICE.

WILLIAM H. SCHULZE, OF CHICAGO, ILLINOIS, ASSIGNOR TO STEWART-WARNER SPEEDOMETER CORPORATION, OF CHICAGO, ILLINOIS, A CORPORATION OF VIRGINIA.

DRIVE CONNECTION FOR TRAVEL-INDICATING INSTRUMENTS.

Application filed July 19, 1922. Serial No. 576,112.

*To all whom it may concern:*

Be it known that I, WILLIAM H. SCHULZE, a citizen of the United States, residing in the city of Chicago, in the county of Cook and the State of Illinois, have invented certain new and useful Improvements in Drive Connections for Travel-Indicating Instruments, of which the following is a specification, reference being had to the accompanying drawings forming a part thereof.

The purpose of this invention is to provide an improved driving connection from a road wheel of a motor vehicle to a travel indicating device carried by the vehicle. It consists in the elements and features of construction shown and described, as indicated in the claims.

In the drawings:—

Figure 1 is a side elevation of the chassis and road wheels of a motor vehicle equipped with this invention.

Figure 2 is a section at the line, 2—2, on Figure 1, being at the vertical diameter of the road wheel and gear thereon, showing in elevation parts embodying this invention.

Figure 3 is a section at the line, 3—3, on Figure 2.

Figure 4 is a view similar to Figure 2 with the road wheel omitted, showing a modification.

Figure 5 is a partly sectional plan view of a swivel gear joint which may be employed in the construction shown, section being made at two parallel planes containing the axes of the in-leading and out-leading shafts, respectively.

In the drawings the frame of the motor vehicle is indicated by the side bars, A. The general type of drive to which the present invention is designed to be applied is that shown, having aligned differential-driven shafts, the differential being indicated at B, B, said shafts carrying at their extremities driving sprocket wheels, C, C, from which drive chains E, extend to driven sprocket wheels F, having their shafts, $f$, journaled in up-standing brackets or standards, D, which are erected upon the end portions of the rigid rear axle, $D^1$, the shafts, $f$, having each at its outer end a spur gear, $F^1$, which meshes with an internal gear rim, H, mounted upon the inner side of the road wheel, J.

For the purpose of the present invention there is mounted upon the rigid rear axle, $D^1$, a bracket or standard, K, which is desirably formed and secured as seen in Figure 3, with a base, $k$, by which the bracket is footed upon the upper side of the rigid axle, $D^1$, a U-clamp, $J^1$, which embraces the axle from below, having its limbs extending through the base, $k$, of the bracket, and secured by nuts thereabove. This form and manner of mounting facilitates adjustably positioning the bracket, K, along the axle, $D^1$, as may be required for properly meshing or aligning the several parts of the drive connection. The bracket, K, has at the upper end a clamp seat, $K^2$, for seating and holding a transversely protruding or horizontal stem, $M^1$, of a second bracket, M, whose upper end is also provided with a clamp seat, $M^2$, for seating and holding a gear housing which comprises two swiveled members, N and O. This gear housing is of a familiar type in general for housing a gear train, comprising three shafts, P, Q and R, of which the shafts, P and Q, protrude respectively from the terminals of the two housing members, N and O, and the third shaft, R, is positioned at the swivel axis of the members, N and O. On the shafts, P and R, are intermeshing gears, $P^1$ and $R^1$, respectively, and on the shaft, R, there is a second gear, $R^2$, intermeshing with the gear, $Q^1$, on the shaft, Q, for transmitting rotation from the shaft, P, to the shaft, Q, through the swivel axis, by way of the shaft, R, and intermeshing gears. The journal bearing of the shaft, P, in the housing member, N, is cylindrical to adapt it to be held in the clamp seat, $M^2$, of the bracket, M, and is of such length as to permit a limited amount of longitudinal adjustment as well as rotary adjustment in said clamp seat. In the form of the device shown in Figures 1, 2 and 3, the shaft, P, carries on its end which protrudes from the journal bearing, $n$, a spur gear, S, whose shaft, $f$, of the sprocket wheel, F, is reduced in diameter at its inner end which protrudes inwardly from the journal bearing of said shaft in the standards, D, for seating and affording a shoulder for stopping the sprocket wheel, F, which is secured on said shaft ordinarily by an exteriorly applied nut, as $f^1$. For applying the present invention, the nut, $f^1$, is removed and there is applied onto the protruding and reduced end of the shaft, $f$, a spur gear, $S^1$, which is secured by re-applying the nut securing both the gear and the sprocket wheel, F. This spur gear, $S^1$, meshes with and drives the spur gear, S, on the protruding end of the shaft, P. The other terminal of the swivel housing from which the shaft, Q, protrudes is exteriorly threaded for receiving the coupling of the casing of a flexible shaft whose rotary element is adapted for driving engagement with the protruding end of said shaft, Q, by the usual male and female terminals of said shafts, respectively.

It will be noticed that the adjustability of the bracket, M, longitudinally of its horizontal stem, $M^1$, bracket, K, provides for adjusting the spur gear, S, directly into the plane of the spur gear, $S^1$, and that the rotatability of the said stem, $M^1$, in the clamp seat, $D^1$, provides for adjusting of the gear, S, for proper depth of meshing it with the gear, $S^1$. It will be further noticed that as the bracket will be normally or ordinarily adjusted for proper meshing of the gears, S and $S^1$, the axis of the swivel joint between the two members of the housing is approximately vertical, which adapts the device to accommodate itself to the proper or more desirable trend of the flexible shaft from the said swivel housing to the travel-indicating device to be operated thereby which is shown at W, and which may be mounted in any desirable position upon the vehicle.

Under some circumstances it may be found possible conveniently to dispense with both the spur gears, S and $S^1$, and to couple the shaft, P, directly to the shaft, $f$, when this is desired, there will be substituted for the nut, $f^1$, a special form of nut, Z (see Fig. 4) having a terminal, $z$, adapted for coupling as shown at $z^1$, to the protruding end of the shaft, P. In order that the structure may be adapted to be used in either way, that is, either with or without the gears, S and $S^1$, and without necessity for such precision in the dimensioning of the bracket, as would otherwise be necessary in order that the axis of the shaft may be swung into alignment with the axis of the shaft, $f$, the terminal clamp seat, $K^1$, of the bracket, K, is desirably formed upon a piece separate from the base of the bracket and adjustable vertically with respect thereto. This is most conveniently accomplished in the manner shown in Figure 4, by providing the main member of the bracket K, with a vertical socket and slitting the socket vertically along one side and providing clamping lugs, $K^4$, $K^4$, and a clamping bolt, $k^4$, and providing the clamp seat member, $K^2$, with a spindle or stem, $k^2$, adapted to enter and be clamped in the vertical socket of the main member of the bracket, K, so that said clamp terminal may be adjusted not only vertically, but also angularly in the base, $k$, to align and relate the several parts for co-operation as described.

I claim:—

1. In a motor vehicle which has a road wheel mounted on and having its axis fixed with respect to a fixed axle, and provided with a laterally mounted concentric gear and a pinion whose journal bearing is carried by the fixed axle meshing with said gear; in combination with such fixed axle and pinion a bracket mounted on the fixed axle; a second bracket mounted on the first, adjustable thereon about, and along an axis parallel to, the road wheel axis; a housing member and co-operating means thereon and on the last mentioned bracket for removably mounting the housing member on the bracket; power-transmitting mechanism carried by said housing, comprising as one final element emerging from the housing, a shaft provided exteriorly of the housing with means for making drive connection with the first mentioned pinion, and as the other final element projecting from the housing, a shaft adapted for coupling to a flexible shaft.

2. In the construction defined in claim 1, foregoing, the first mentioned bracket having clamping means for securing the second bracket to the first, said clamping means, being formed as a part separate from the base of said first bracket and vertically adjustable with respect to said base, and means for securing it in vertically adjusted position on the base.

3. In the construction defined in claim 1, foregoing, the first mentioned bracket having clamping means for securing the second bracket to the first, said clamping means being formed as a part separate from the base of the first bracket and adjustable vertically with respect to said base and angularly about a vertical axis, and means for securing it in adjusted position with respect to the base.

4. In a motor vehicle which has a road wheel mounted on, and having its axis fixed with respect to, a fixed axle, and provided with a laterally mounted concentric gear, and a pinion whose journal bearing is carried by the fixed axle meshing with said gear; in combination with said fixed axle and pinion; a housing for power transmitting mechanism, and mechanism therein comprising a final element emerging at one end of the housing adapted for driving engagement with the first mentioned pinion, and a final element emerging at the opposite end, adapted for coupling to a flexible shaft; a three-part supporting means for said housing comprising a bracket member mounted on the fixed axle, and two members successively mounted, the first on the said bracket member and the second on the first, the two junctions by which said three members are connected successively comprising (a) means for vertical adjustment, (b) means for adjustment parallel to the road wheel axis, and (c) means for adjustment about a vertical axis; and means for securing the three parts at their relatively adjusted positions.

In testimony whereof, I have hereunto set my hand at Chicago, Illinois, this 14th day of July, 1922.

WILLIAM H. SCHULZE.